United States Patent [19]
Knauss et al.

[11] Patent Number: 5,746,291
[45] Date of Patent: May 5, 1998

[54] FLOOR CONVEYOR VEHICLE

[75] Inventors: Hans-Peter Knauss, Leonberg; Hartmut Mayer, Ditzingen; Bernhard Goetz, Aschaffenburg, all of Germany

[73] Assignee: Dr. Ing. h.c.F. Porsche AG, Germany

[21] Appl. No.: 673,086

[22] Filed: Jul. 1, 1996

[30] Foreign Application Priority Data

Jul. 1, 1995 [DE] Germany ............... 195 24 075.8

[51] Int. Cl.$^6$ ............... B66F 9/20
[52] U.S. Cl. ............... 187/223; 187/224
[58] Field of Search ............... 187/222, 223, 187/224, 231, 240, 244; 180/272, 273

[56] References Cited

U.S. PATENT DOCUMENTS 4,061,053  12/1977  Keene et al. ............... 74/512
5,195,606  3/1993  Martyniuk ............... 180/272

FOREIGN PATENT DOCUMENTS 0 607 500 A1  1/1993  European Pat. Off. .
473 035  7/1969  Switzerland .

*Primary Examiner*—Kenneth Noland
*Attorney, Agent, or Firm*—Evenson, McKeown, Edwards & Lenahan, P.L.L.C.

[57] ABSTRACT

A floor conveyor vehicle, particularly a stacker, has a brake device and an adjustable floor panel guided in the vertical direction by way of a device and is held in several working positions by a locking device. The floor panel is guided in the vertical direction by a lifting frame on a column arranged on one side of the vehicle. The floor panel is constructed as an operating plate for a parking brake and, with a pedal plate for a service brake, is swivellably linked to the lifting frame on axes.

12 Claims, 6 Drawing Sheets

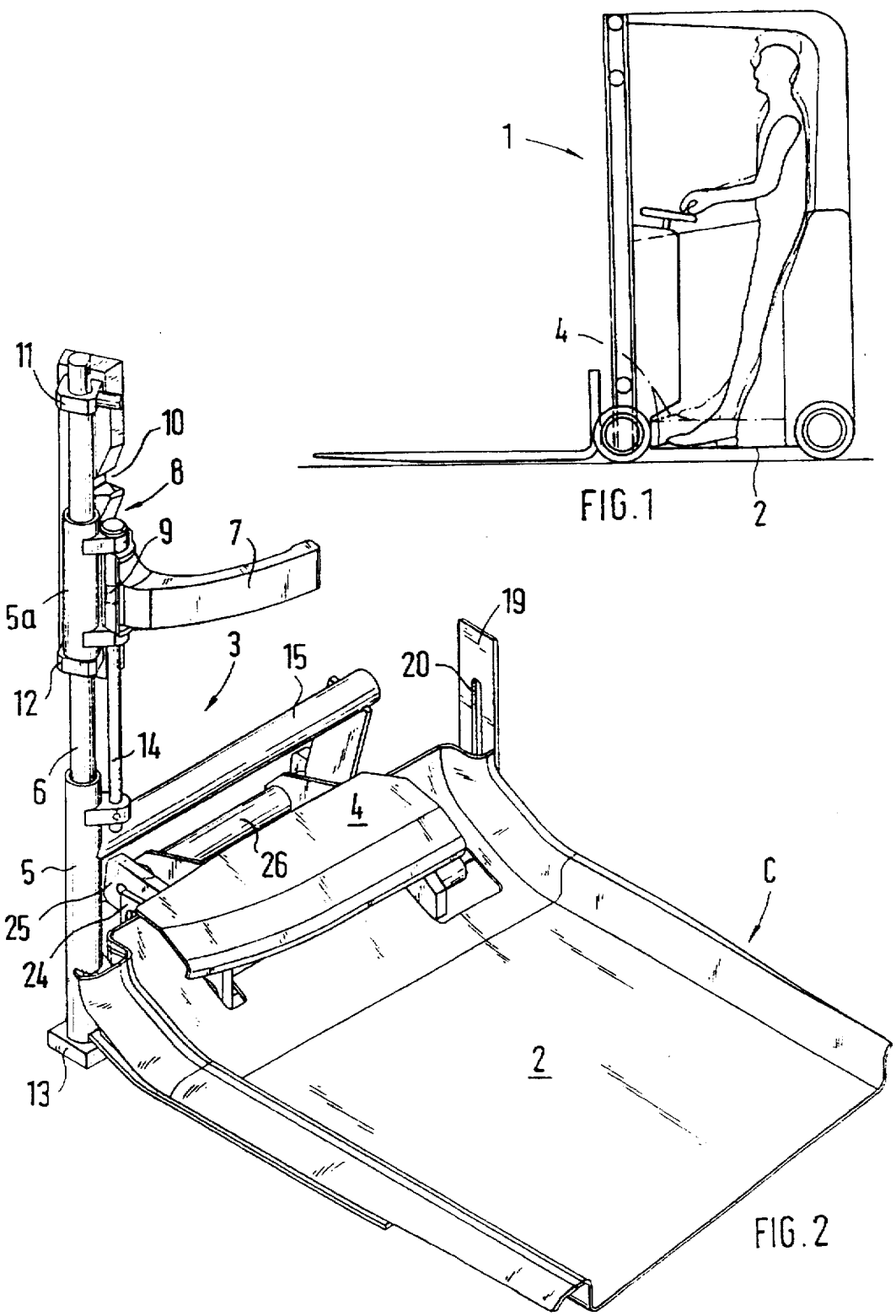

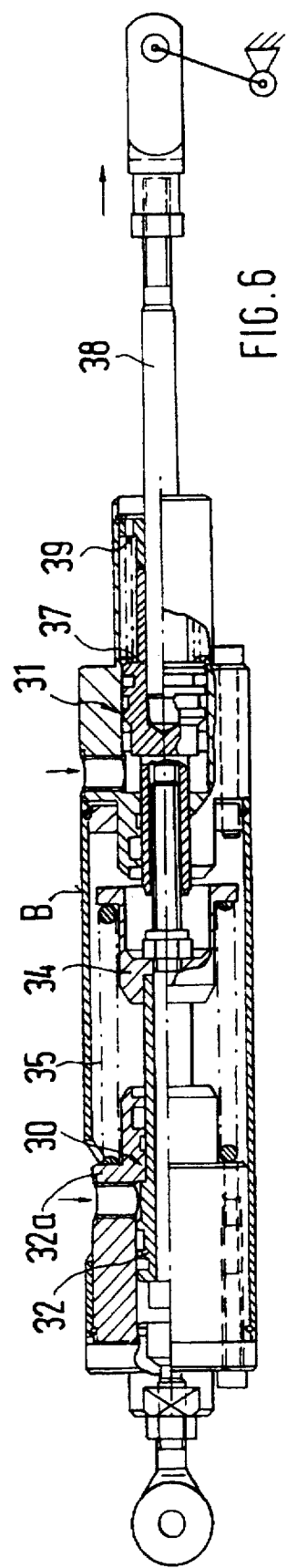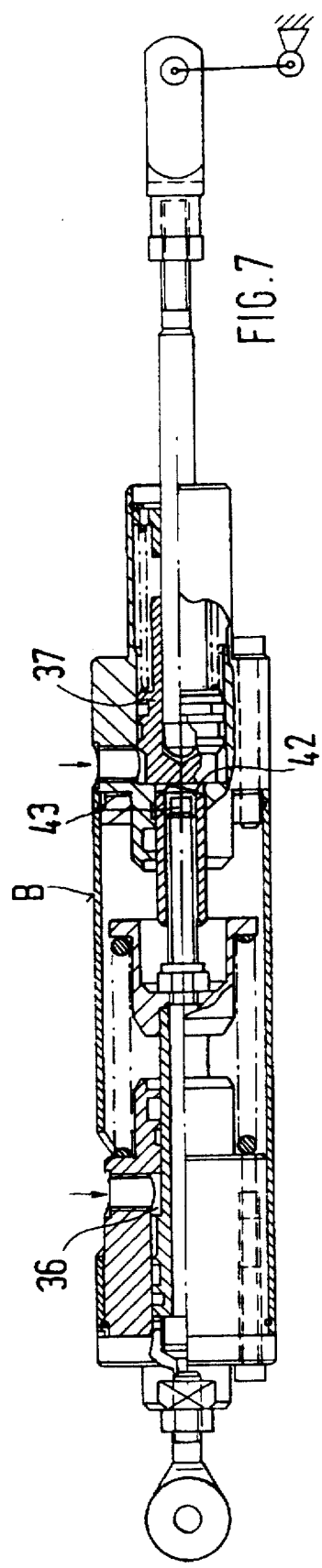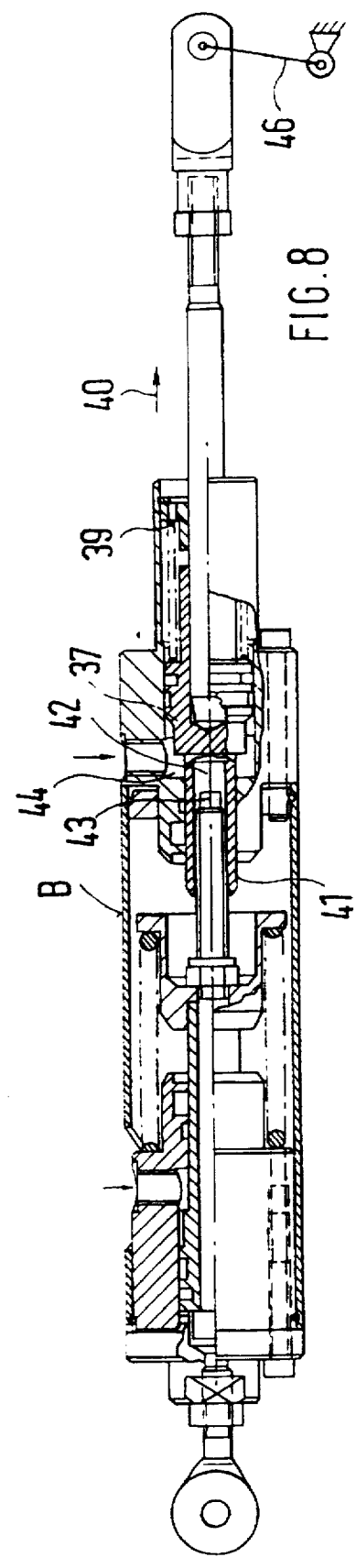

FLOOR CONVEYOR VEHICLE

BACKGROUND AND SUMMARY OF THE INVENTION

The present invention relates to a floor conveyor vehicle, particularly a stacker, with a braking device and an adjustable floor panel, and more particularly, to a floor conveyor device in which the adjustable floor panel is guided in the vertical direction by a device and is held in several positions by a locking mechanism.

EP 0 607 500 A1 describes an adjustable floor panel for a floor conveyor vehicle, the floor panel being adjustable in its height and inclination. For this purpose, a carriage is guided in a vertically adjustable manner on the frame of the vehicle on one side of the floor panel.

It is an object of the present invention to provide a floor conveyor vehicle with a floor panel which can be ergonomically adapted and adjusted to the operator and into which a brake control device for a dead man's brake as well as a service brake is integrated.

According to the present invention, this object has been achieved by providing that the floor panel is guided in the vertical direction by way of a lifting frame on a column arranged on one side of the vehicle and the floor panel is constructed as an operating plate for a parking brake and with a pedal plate for a service brake is swivellably connected on the lifting frame on shafts.

Among the principal advantages achieved by the invention are that the floor panel, which is height adjustable, is used as a so-called operating plate for a vehicle parking brake (or so-called dead man's brake) and a pedal plate for a service brake is arranged in the plane of the floor panel. The floor panel is vertically adjusted so that operators of different heights can operate and drive the stacker in a ergonomically correct body position. The floor panel as well as the pedal plate are held on the lifting frame and are guided in a vertically adjustable manner by way of a column fixed to the vehicle.

At the same time, in each vertical position, a parking brake can be operated by the floor panel, with the pedal operation acting upon a service brake. The lifting frame is a constructional unit and can be simply manufactured and mounted. The lifting frame has supports which project transversely away from the sliding sleeve arranged on the column fixed to the vehicle, and the supports are held on the end side on the vehicle body. Also, a transverse member is provided with bearing arms for receiving the swivel shafts of the floor panel, in which case the swivel shaft of the pedal plate is, in turn, pivotally connected to swivel arms of the floor panel. The supporting of the floor panel in the horizontal position takes place on supports having the corresponding construction.

The adjustment of the lifting frame with the pedal plate and the floor panel takes place, for example, manually by a handle. Such adjustment may, however, also take place hydraulically and/or electrically. The handle is swivellably mounted on the sliding sleeve. This handle extends, for example, transversely with respect to the vehicle and has a locking mechanism which secures the taken-up position of the floor panel in the vertical direction. So that the manual adjustment can be aided by outside force, a spring element, such as a gas spring or a spiral spring may be used. A gas spring may also be used which can be blocked in different positions so that the mechanically operating locking mechanism will not be required.

The parking brake is operated by the floor panel, and the service brake is operated by the pedal plate. For this purpose, a hydraulic control circuit having a brake cylinder is provided. This brake cylinder is constructed in such a manner that the service brake can operate independently of the parking brake. The brake cylinder has two piston units which are situated behind one another in the operating direction and operate separately. One piston unit is provided with a piston rod for operating the vehicle brake.

The piston unit is situated in the rear in the brake cylinder with respect to the brake lever and is constructed, for example, for operating the parking brake by way of the floor panel. Accordingly, the forward-situated piston unit is used, for example, for operating the vehicle brake via the pedal plate. So that the brake cylinder can be operated by way of the hydraulic control circuit, the floor panel and the pedal plate act upon triggering switches or valves For braking the vehicle by way of the parking brake, the floor panel automatically takes up a swivelled-up position which is achieved when the operator leaves the stacker. During the upward swivelling, a spring in the brake cylinder displaces the piston rod toward the outside and causes a brake operation so that the stacker will stop immediately. The operation of the pedal plate will cause a braking of the vehicle during the drive.

For simplifying the mounting and a repair of the lifting frame, it is possible to pull the column in a simple manner out of the sleeve.

BRIEF DESCRIPTION OF THE DRAWINGS

These and other objects, features and advantages of the present invention will become more readily apparent from the following detailed description thereof when taken in conjunction with the accompanying drawings wherein:

FIG. 1 is a lateral view of a stacker with a vertically adjustable and swivellable floor panel which is shown in two positions;

FIG. 2 is a perspective view of a detail of the vertically adjustable floor panel with the pedal plate and the lifting frame in the lowered, unbraked initial position;

FIG. 6 is a partial cross-sectional view of a brake cylinder with two piston units situated behind one another in the position of a braked parking brake;

FIG. 7 is a partial cross-sectional view of the brake cylinder similar to FIG. 6 but with the brake cylinder in the position of a released parking and service brake;

FIG. 8 is a partial cross-sectional view of the brake cylinder similar to FIG. 6 but with the brake cylinder in the position of a released parking brake and a braked service brake.

DETAILED DESCRIPTION OF THE DRAWINGS

Figure 3:
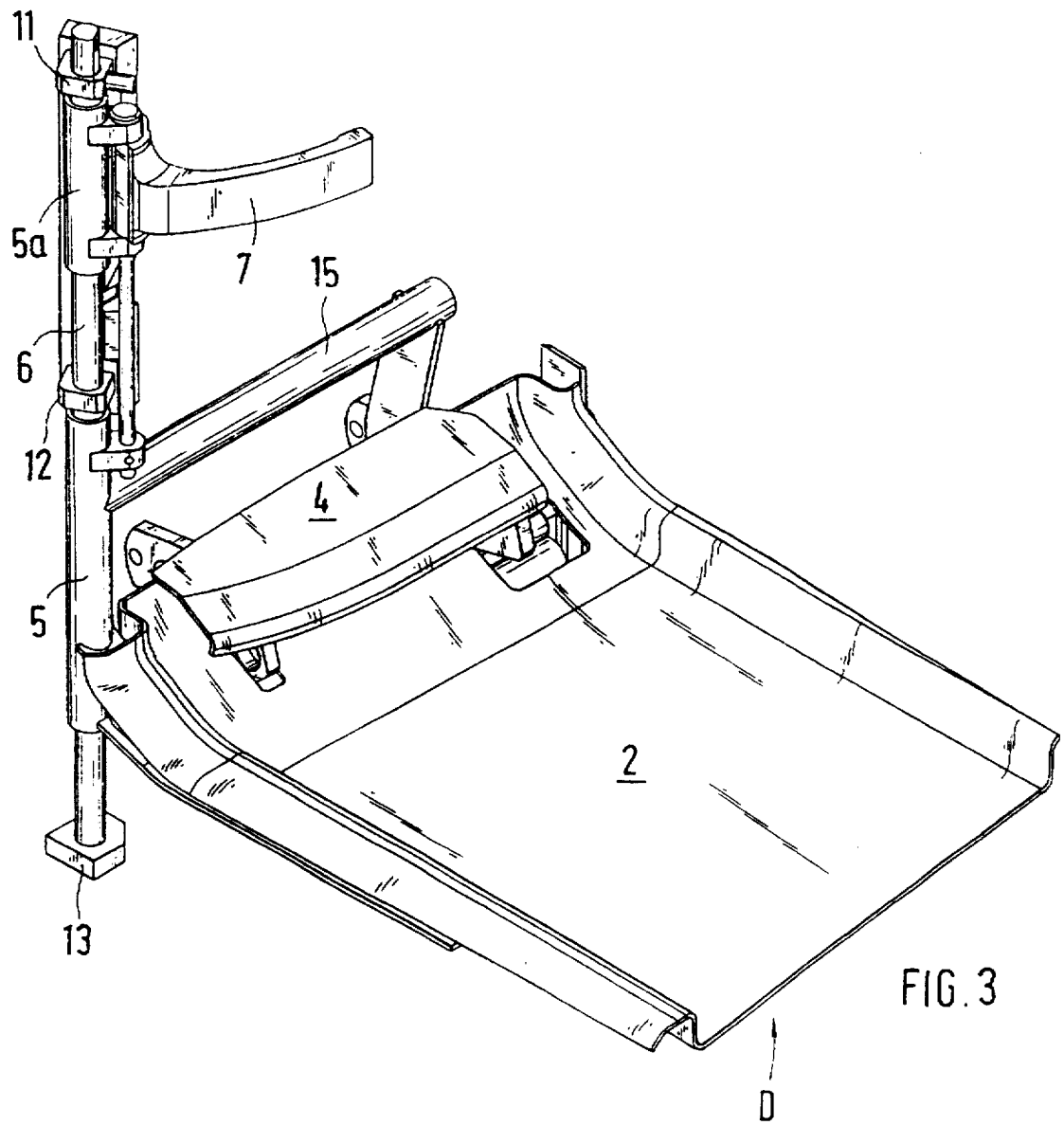
FIG. 3 is a perspective view similar to FIG. 2 but with the floor panel in the lifted and locked position while the parking brake is not braked.

Referring now to FIG. 1, the body of a floor conveyor vehicle designated generally by numeral 1 has a floor panel 2 which can be vertically adjusted by way of a lifting frame designated generally by numeral 3 in FIG. 2 and is at the same time provided with a service brake and a parking brake or so-called dead man's brake. For this purpose, the floor panel 2 is swivellably held on the lifting frame 3 so that, when the driver leaves the stacker, the floor panel 2 can automatically swivel upwards and, by way of a control device, the vehicle brake is operated by a brake cylinder B.

Furthermore, a pedal plate 4 for operating a service brake is integrated into the floor panel 2. The service brake and the parking brake are the same brake of the vehicle. The pedal plate 4 is also pivotally connected to the frame 3 and is vertically adjustable with the floor panel 2.

The lifting frame 3 is held in a vertically adjustable manner by way of at least one sliding sleeve 5 and 5a on a vehicle-fixed column 6 on one side of the stacker 1. A handle 7 is swivellably connected with the sliding sleeve 5a, by means of which handle 7 the lifting frame 3 of the floor panel 2 can be lifted or lowered. A locking device 8 on the handle consists of cam 9 in the handle 7 and detents 10 on a rail or a corresponding part of the vehicle body.

As illustrated in detail in FIG. 2, the column 6 is held on the vehicle body at three bearing points 11, 12 and 13 which are at the same time used as stops for the two displacement sleeves 5 and 5a. A rod 14 fixedly connected the sleeves 5, 5a with one another. However, depending on the construction, only two bearing points 11 and 13 need be provided, in which construction the bearing sleeve will then be one continuous piece instead of two sleeves 5, 5a.

Figure 5:
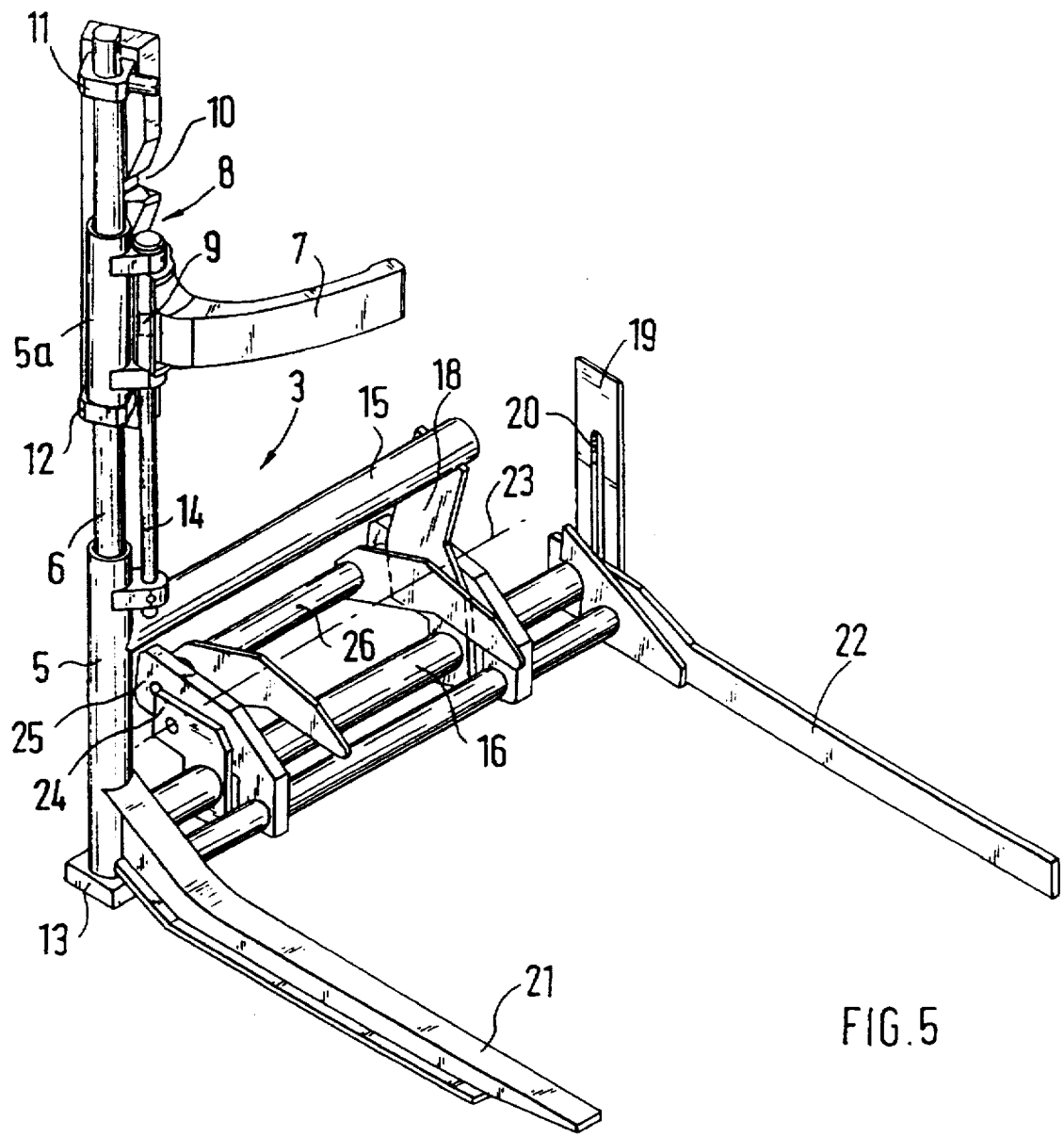
FIG. 5 is a perspective view of the lifting frame without the stepping and pedal plate with the handle and the locking mechanism.

The handle 7 is swivellably disposed in the one top displacement sleeve 5a. The lower displacement sleeve 5 is connected with transversely directed supports 15, 16 (see, in particular, FIG. 5), in which the upper support 15 supports, via a supporting plate 18, the support 16 which is guided on the end side in an abutment 19 in the vertical direction by a pin or the like in a slot 20. Supports 21, 22 (FIG. 5) for the floor panel 2 extend in the longitudinal direction of the vehicle and are connected with the transverse member 16. One support 21 is also fastened on the additional displacement sleeve 5.

Figure 4:
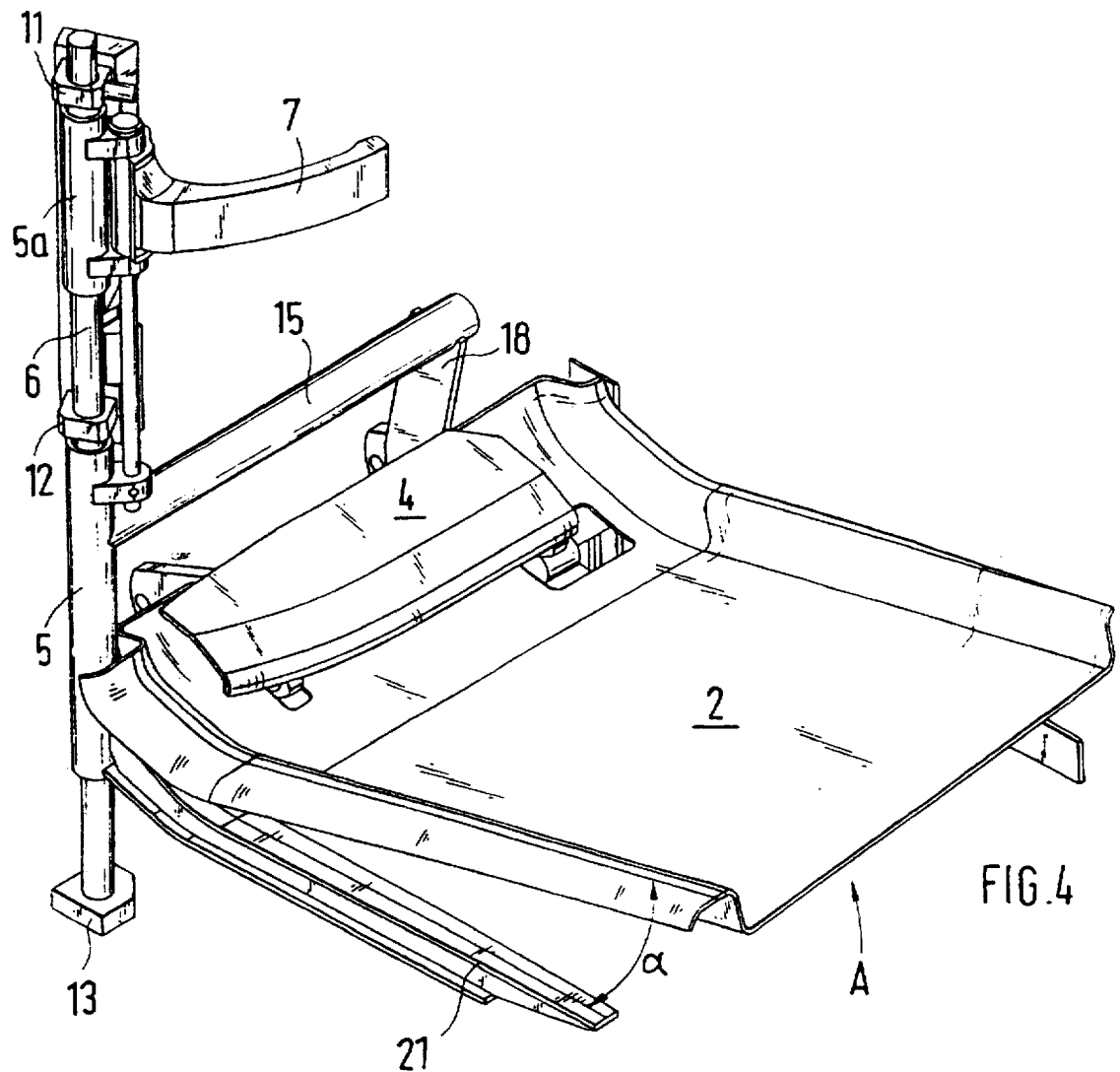
FIG. 4 is a perspective view similar to FIG. 2 but with the floor panel in the lifted and swivelled position while the parking brake is braked.

The floor panel 2 can be swivelled upwards by swivel arms 25 on a shaft 23, which is held in bearing arms 24 of the transverse member 16, at an angle α into a braking position A as seen in FIG. 4, and can be swivelled downwards into non-braking position D as seen in FIG. 3. In the non-braking position D, the floor panel 2 rests on the supports 21 and 22.

A shaft 26 for the pedal plate 4 is also held in the swivel arms 25 of the floor panel 2. Swivel shafts 23, 26 may also be arranged on the same axis without departing from the scope of the present invention. During a swivelling of the floor panel 2, the pedal plate 4 will then be correspondingly swivelled along. For lifting the floor panel 2, the displacement sleeves 5, 5a can have a supporting device, such as a gas spring, a spiral spring or correspondingly operating devices.

FIGS. 6 to 8 show different positions of the piston units 30, 31 in the brake cylinder B when the parking brake is operated by the floor panel 2 and when the service brake is operated by the pedal plate 4. In the brake cylinder B, the two piston units 30, 31 are arranged behind one another. Each piston unit is held independently of the other piston unit. That is, they are held separately from one another in the brake cylinder B.

The one piston unit 30 for the parking brake has a piston 32 which is acted upon by pressure and has a surrounding stop part 32a and a pressure piece 34 connected with the latter by way of a screw 43. Between this pressure piece 34, which forms a spring plate, and the stop part 32a, a pressure spring 35 is arranged which, in the position of the floor panel 2 at the angle α, closes the parking brake. When the floor panel 2 is loaded by the operator, a space 36 is acted upon by pressure, the piston 32 moves back, and the parking brake is opened up, as illustrated in FIG. 7.

The piston unit 31 for the service brake, which is operated by the pedal plate 4, has a piston 37 which is connected with a rod 38 for the connection with a brake lever 46 for the brake. This piston 37 is held by pressure spring 39 in a position in which the service brake is opened up, as also shown in FIG. 7. When an operating or pressing-down of the pedal plate 4 occurs, the space 44 is acted upon by pressure, and the rod 38 is displaced in the direction of the arrow 40 and operates the service brake. A pin 41 is arranged on the piston 37 and has a bore 42 on the face into which the end of the rod 43 engages.

Figure 9:
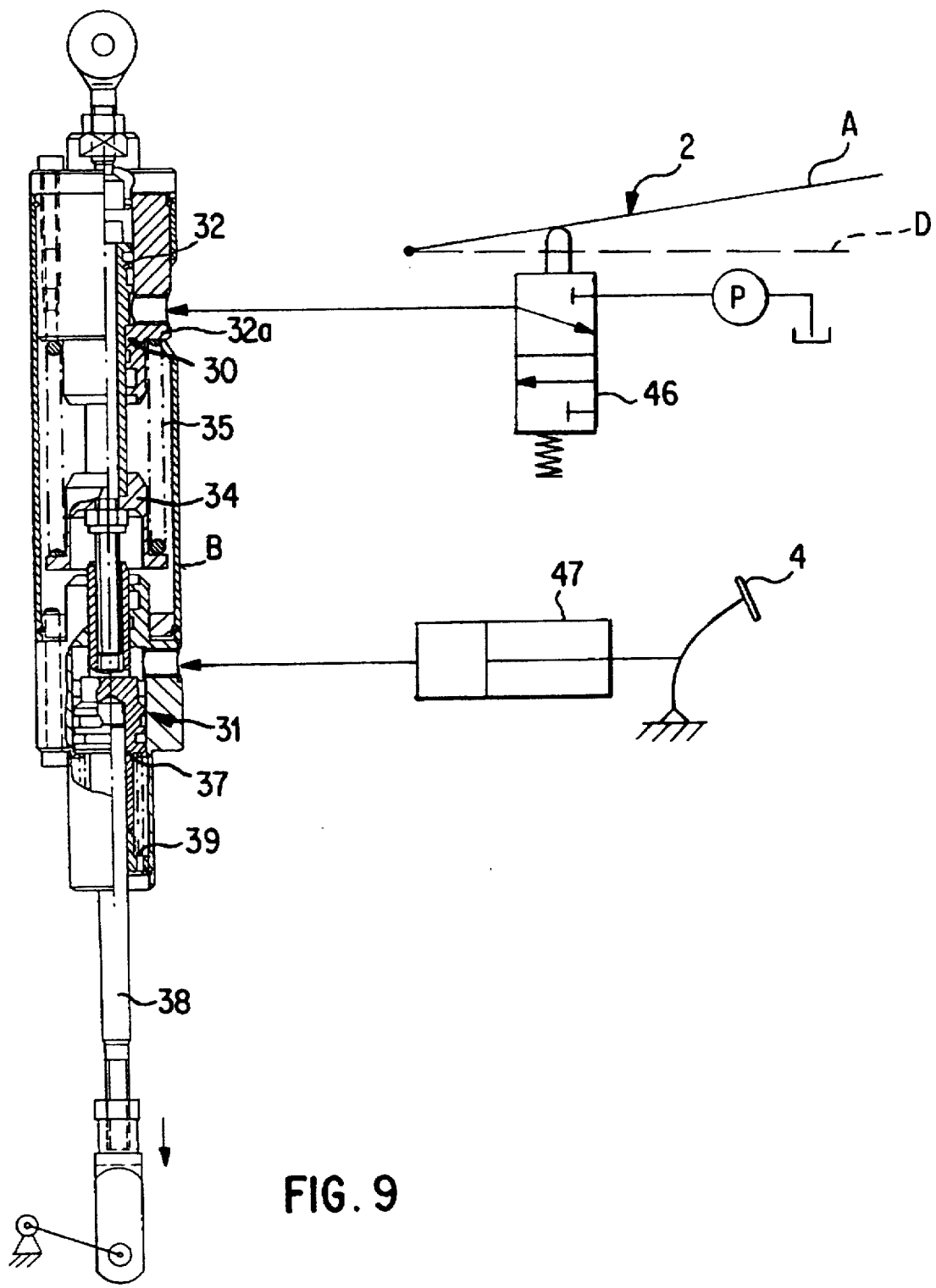
FIG. 9 is another partial cross-sectional view of the brake cylinder shown in FIGS. 6–8 and a schematic showing of the control mechanism.

As seen in FIG. 9, the control mechanism between floor panel 2 and the brake cylinder B is a ½-way valve 46 of conventional construction and a brake pressure cylinder 47 associated with the pedal plate 4. The floor panel 2 is shown in solid lines designated by the letter A (see also FIG. 4) with the brake pressure cylinder B having the corresponding position shown in FIG. 6. Similarly, dash lines D in FIG. 9 show the floor panel 2 in the position which the brake cylinder B assumes in FIG. 7.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A floor conveyor vehicle, such as a stacker, comprising a braking device and an adjustable floor panel guidable in a vertical direction and holdable in multiple working positions by a locking device, wherein a lifting frame is operatively associated with the floor panel via a column arranged on one side of the vehicle to provide the vertical guidability, and the floor panel is configured as an operating plate for a parking brake and has a pedal plate for a service brake, and shafts swivellably connect the floor panel and the pedal plate on the lifting frame.

2. The vehicle according to claim 1, wherein the pedal plate is integrated in the floor panel, such that the pedal plate can be operated via a control device independently of the parking brake operated by way of the floor panel.

3. The vehicle according to claim 1, wherein the column is fastened by holding devices on a vehicle body and comprises a tube on which at least one displacement sleeve of the lifting frame is guided and connected with a lower transverse member for receiving supports for the floor panel, and an additional upper transverse member is fastened to one displacement sleeve and is supported on an end side on a supporting plate.

4. The vehicle according to claim 3, wherein the lower transverse member is guided by a free end thereof in an abutment of the vehicle body and has bearing arms for the associated shaft of the floor panel in which the swivel arms of the floor panel are held, and an additional shaft for swivelling the pedal plate is disposed therein.

5. The vehicle according to claim 3, wherein a swivellable handle is operatively associated with the at least one displacement sleeve and comprises a locking device having a cam on the handle and detents on the vehicle body corresponding to the handle arranged above one another.

6. The vehicle according to claim 1, wherein the column has, between two holding devices, at least one displacement sleeve, fixedly connected with one another by a rod, and, in a lower position of the floor panel, an upper displacement sleeve of the at least one displaceable sleeve rests on a central holding device and a lower displacement sleeve of the at least one displacement sleeve rests on a lower holding device.

7. The vehicle according to claim 1, wherein the at least one displacement sleeve is connected with a device or causing the vertical movement of the floor panel.

8. The vehicle according to claim 7, wherein the device for causing vertical movement is one of a spring element and a gas spring element.

9. The vehicle according to claim 1, wherein the floor panel and the pedal plate each acts, via a control valve, in a pressure-admitting manner, on a brake cylinder for operating a brake, and the brake cylinder has two piston units situated behind one another, a first of the piston units being arranged for operating the parking brake via the floor panel, and the second of the piston units being arranged for operating the service brake via the pedal plate.

10. The vehicle according to claim 9, wherein the first piston unit is independently arranged with respect to the second piston unit in the brake cylinder for that adjustment of a common piston rod connected with the vehicle brake.

11. The vehicle according to claim 9, wherein the one piston unit for the parking brake has a pressure actuatable piston and a pressure piece connected with the piston via a connection element, and a pressure spring is arranged between the pressure piece and a stop part surrounding the piston.

12. The vehicle according to claim 9, wherein the second piston unit for the service brake has a piston with a pin having a bore in which a rod of the first piston unit is arranged, a piston rod for the brake is provided, on an end of the piston facing away, and the piston is supported by a pressure spring against an operating direction for braking.

* * * * *